Patented Nov. 6, 1928.

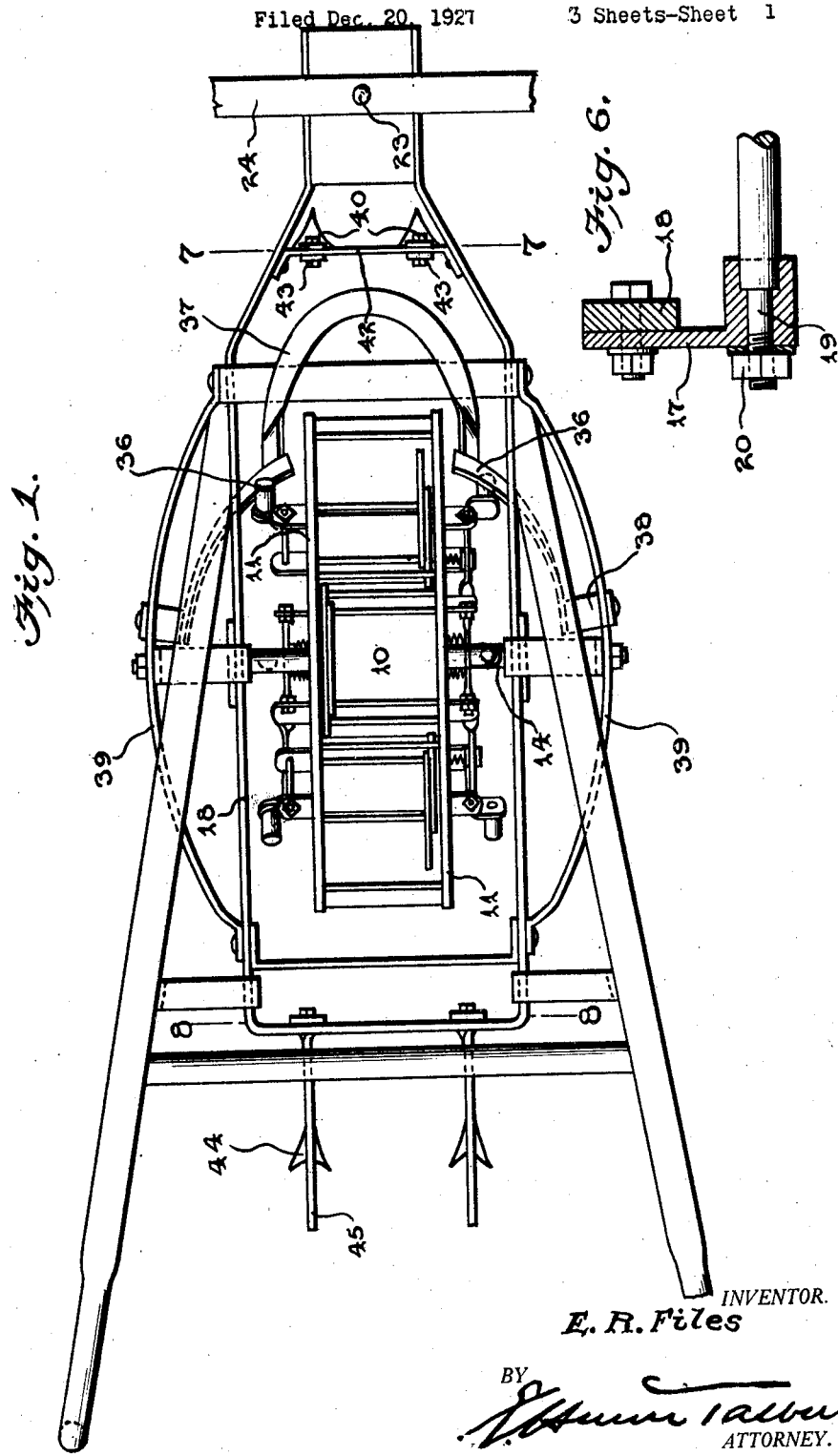

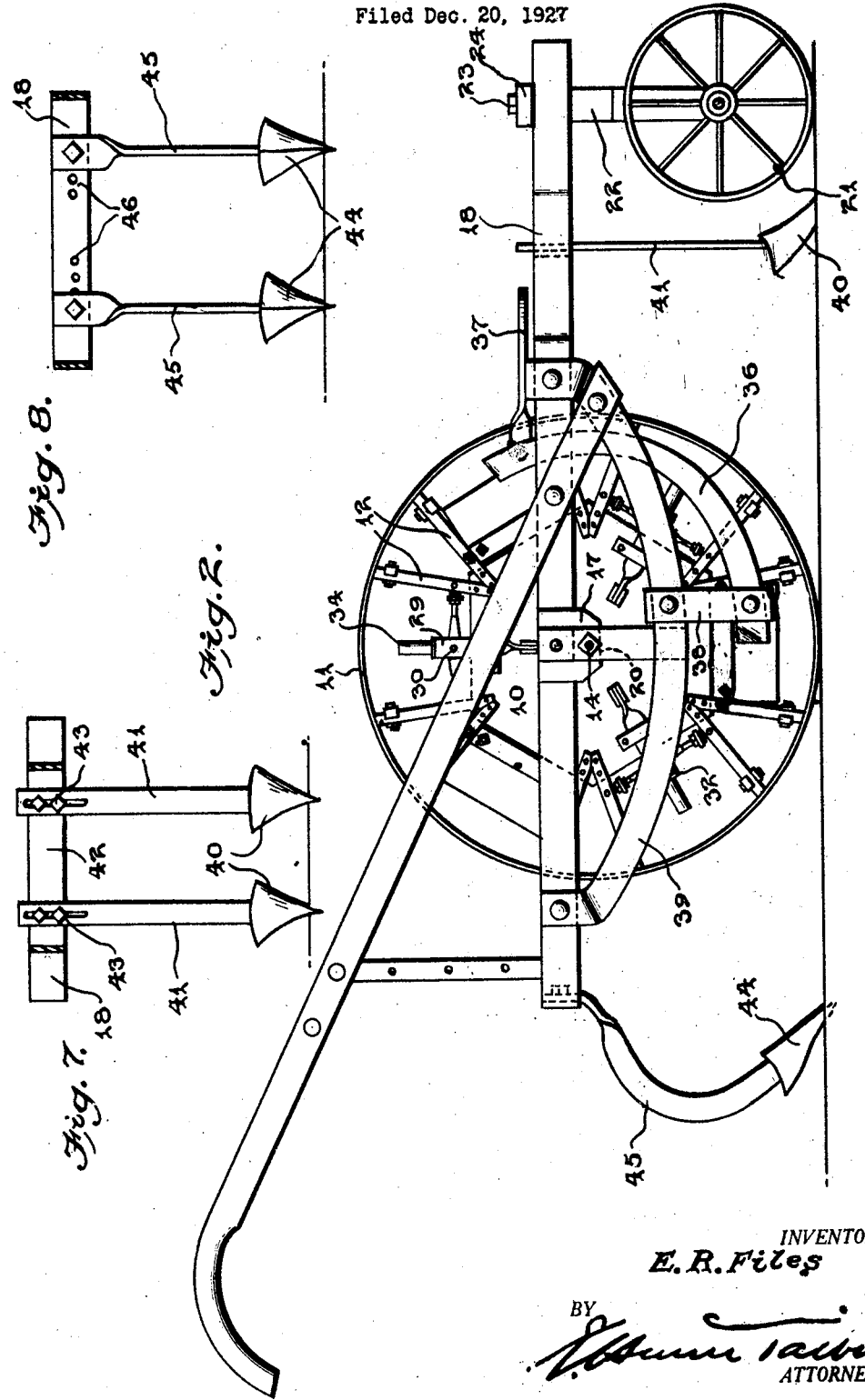

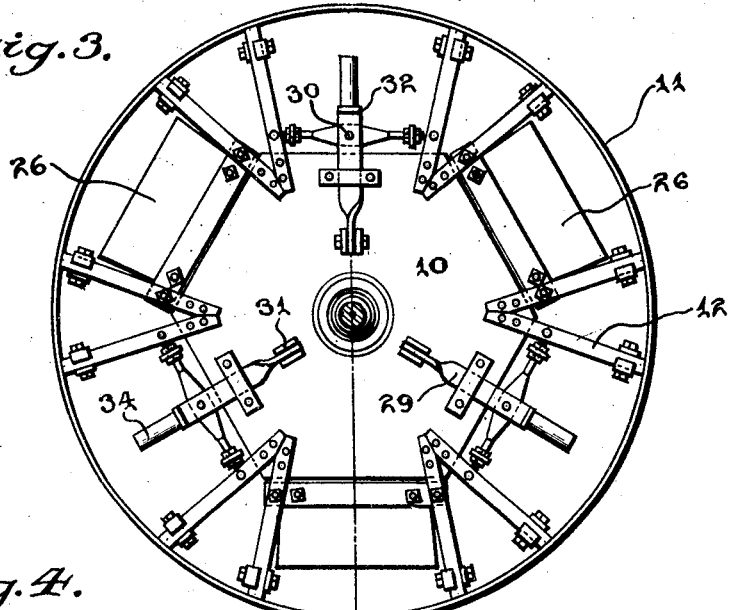
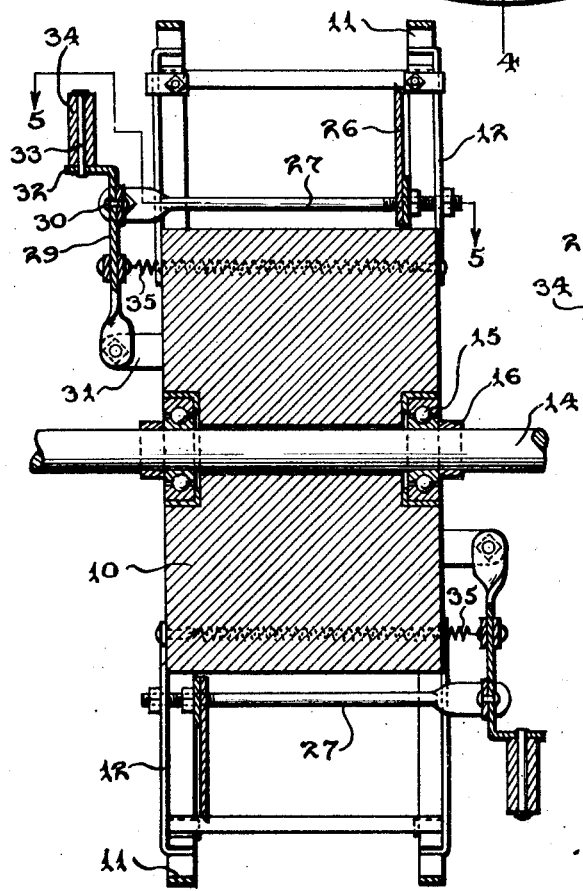
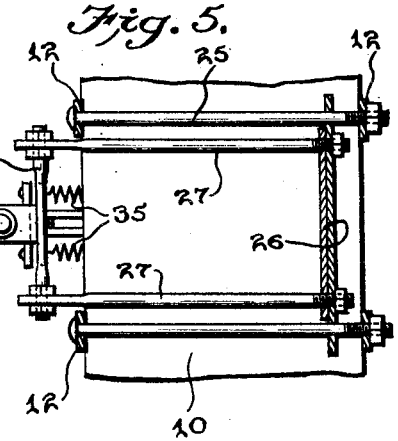

1,690,928

UNITED STATES PATENT OFFICE.

ELIE REAVES FILES, OF BALDWYN, MISSISSIPPI.

COTTON CHOPPER.

Application filed December 20, 1927. Serial No. 241,324.

The object of the invention is to provide a device particularly adapted for chopping and thinning out cotton and constructed so as to be moved by a tractor or draft animals and controlled by a single operator, thus enabling him to accomplish the work of a number of hands; to provide a device of this character equipped with a multiplicity of hoes automatically actuated as the machine is moved; and to provide a machine of this character equipped with lead and follower plows of which the former are adjustable to properly position the hoes with reference to the ground and the latter laterally adjustable to effect the covering operation to suit the preferences of the operator.

With this object in view, the invention consists in a construction and combination of parts of which a preferred embodiment is illustrated in the accompanying drawings, wherein:

Figure 1 is a plan view of the invention.
Figure 2 is a side elevational view.
Figure 3 is an elevational view of the hoe cylinder.
Figure 4 is a sectional view on the plane indicated by the line 4—4 of Figure 3.
Figure 5 is a sectional view on the plane indicated by the line 5—5 of Figure 4.
Figure 6 is a detail sectional view of the hoe cylinder axle mounting.
Figures 7 and 8 are respectively transverse sectional views on the planes indicated by the lines 7—7 and 8—8 of Figure 1.

The vital element of the invention consists of the hoe cylinder composed of a polygonal body section 10 bounded at its side edges with circular runners 11 spaced from the body section and secured to the latter by radial arms 12. The body section is rotatably mounted on an axle 14, being carried on ball bearings 15 and secured against movement longitudinally of the axle by means of collars 16. The axle is mounted at its extremities in hangers 17 secured to and depending from the side bars of the frame 18, the ends of the axle being reduced as at 19 and having threaded extremities receiving the nuts 20 by which the axle is secured in the hangers. The circular runner 11 of the hoe cylinder constitute the supporting means for the frame together with the caster wheels 21 which are carried by a fork 22 swivelly mounted in the frame at the forward end, the pivot bolt 23 of the fork having attached to it a whiffle-tree 24 to which draft animals may be hitched, if such are employed. Obviously, if a tractor be used, the draft connections between it and the forward end of the frame may be employed.

The radial bars 12 which secure the runners 11 to the body element of the hoe cylinder are spanned by bolts 25 arranged in pairs of which the units of each pair constitute guides for the hoes 26, the latter having connected with them stem bolts 27 spanned at the ends remote from the hoes with cross-heads 28 with which the radial levers 29 are pivotally connected at intermediate points as indicated at 30. The inner ends of the levers 29 are pivotally mounted in lateral brackets 31 carried by the body element 10 and the outer ends are bent outwardly as indicated at 32 to receive the radially disposed spindles 33 of cam rolls 34.

The hoes are disposed normally at the sides of the body element 10, adjacent hoes being at opposite sides of the body element and these normal positions are maintained with the action of the tensile springs 35 of which each hoe is equipped with a pair having their one end secured to the lever 29 at a point between the cross-head 28 and the bracket 31 and the remote ends secured to the body element on the side opposite the connected lever, the spring extending through clearance holes formed transversely in the body element.

As the frame is advanced over the ground, the hoe cylinder rotates by reason of its runners 11 engaging the latter and it is designed to have the hoes move transversely of the cylinder during its rotation. To effect this, the frame 18 is provided with cam rails 36, these latter being of generally arcuate form and arranged to extend laterally away from the hoe cylinder, being closest to the latter at their upper ends and farthest away at their lower ends. The upper ends of the cam rails are connected with a yoke 37 carried by the frame 18 at the forward end and at their lower ends are supported by brackets 38 secured to the bracket rails 39 which constitute elements of the frame 18. As the hoe cylinder rotates, the cam rolls 34 engage the cam rails 36 and by reason of the shape of the latter, the levers 29 are rocked on their pivotal connection with the brackets 31, thus effecting movement of the hoes laterally of the cylinder. When the cam rolls have passed beyond the cam rails, the springs 35 function to return the hoes to their normal positions at the sides of the cylinder.

The lead plows 40 of which the shanks 41 are carried on a cross bar 42 at the forward end of the frame are adjustable as to depth by means of slot and bolt connections 43. These plows are positioned in alignment with the circular runners 11 and in the movement of the machine cut shallow trenches in which the circular runners 11 travel. The adjustment of the plows 40 determines the position of the hoes with reference to the ground by reason of fixing the trenches in which the runers 11 travel.

The covering plows 44 carried at the rear end of the frame are mounted on shanks 45 in which they are detachably secured, so that various forms of shovels may be employed. The shanks 45 are adjustable laterally of the frame 18, since they may be secured by the latter through any one of the holes 46 in the transverse rear bar of the frame. The covering shovels may therefore be positioned laterally of the cam cylinder to suit the preference of the operator.

The invention having been described, what is claimed as new and useful is:

1. A cotton chopper comprising a cylinder, a frame in which the cylinder is rotatably mounted, the cylinder comprising a body element and circular runners in surrounding relation to the same and constituting supporting means for the frame, hoes mounted between the runners and the body element for movement transversely of the cylinder, and cooperative frame-carried and cylinder-carried elements for actuating the hoes upon rotation of the cylinder.

2. A cotton chopper comprising a cylinder, a frame in which the cylinder is rotatably mounted, the cylinder comprising a body element and circular runners in surrounding relation to the same and constituting supporting means for the frame, hoes mounted between the runners and the body element for movement transversely of the cylinder, cooperative frame-carried and cylinder-carried elements for actuating the hoes upon rotation of the cylinder, said cooperative elements comprising cam rails carried by the frame, and levers carried by the cylinder and operatively connected with the hoes and having rolls engaging said cam rails.

3. A cotton chopper comprising a cylinder, a frame in which the cylinder is rotatably mounted, the cylinder comprising a body element and circular runners in surrounding relation to the same and constituting supporting means for the frame, hoes mounted between the runners and the body element for movement transversely of the cylinder, cooperative frame-carried and cylinder-carried elements for actuating the hoes upon rotation of the cylinder, said cooperative elements comprising cam rails carried by the frame, and levers carried by the cylinder and operatively connected with the hoes and having rolls engaging said cam rails, the levers being provided with springs for moving them in the opposite direction from that in which they are moved by the cam rails.

In testimony whereof he affixes his signature.

E. R. FILES.